(12) United States Patent
Billich

(10) Patent No.: US 11,261,944 B2
(45) Date of Patent: Mar. 1, 2022

(54) POWERSHIFT TRANSMISSION

(71) Applicant: DEERE & COMPANY, Moline, IL (US)

(72) Inventor: Manuel Billich, Dischingen (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/902,322

(22) Filed: Jun. 16, 2020

(65) Prior Publication Data

US 2020/0400217 A1     Dec. 24, 2020

(30) Foreign Application Priority Data

Jun. 19, 2019   (DE) .......................... 102019208948.8

(51) Int. Cl.
*F16H 3/72* (2006.01)
*F16H 3/00* (2006.01)
*F16H 3/54* (2006.01)

(52) U.S. Cl.
CPC ............. *F16H 3/727* (2013.01); *F16H 3/006* (2013.01); *F16H 3/54* (2013.01)

(58) Field of Classification Search
CPC ...................................................... F16H 3/727
See application file for complete search history.

(56) References Cited

U.S. PATENT DOCUMENTS

| | | | |
|---|---|---|---|
| 2003/0036451 A1 | 2/2003 | Weeramantry et al. | |
| 2008/0078591 A1* | 4/2008 | Schondorf | B60K 6/387 180/65.235 |
| 2010/0173746 A1* | 7/2010 | Ideshio | B60K 6/48 477/36 |
| 2011/0143874 A1* | 6/2011 | Tangl | B60K 6/365 475/5 |
| 2017/0292595 A1* | 10/2017 | Bagusch | F16H 47/04 |

FOREIGN PATENT DOCUMENTS

| | | | |
|---|---|---|---|
| DE | 2335629 A1 | 1/1975 | |
| DE | 10319252 A1 | 11/2004 | |
| DE | 102008015276 A1 | 9/2009 | |
| DE | 102016205933 A1 | 10/2017 | |
| DE | 102017219995 A1 * | 5/2019 | ............ F16H 47/04 |
| EP | 0818643 A2 | 1/1998 | |
| EP | 1626206 A2 | 2/2006 | |
| WO | WO-2017068256 A1 * | 4/2017 | ............ B60K 6/387 |

OTHER PUBLICATIONS

European Search Report issued in counterpart application No. 20180047.1 dated Sep. 4, 2020 (07 pages).

* cited by examiner

*Primary Examiner* — Timothy Hannon

(57) ABSTRACT

A powershift transmission includes an input shaft, an output shaft arranged parallel with the input shaft, a branching unit arranged on the input shaft through which a torque acting on the input shaft is divided between two power paths, a switch group including at least two switching stages arranged in the first power path, and a torque converter arranged in the second power path. A torque is transmitted from the input shaft to the output shaft via the switch group and the torque converter.

17 Claims, 3 Drawing Sheets

POWERSHIFT TRANSMISSION

RELATED APPLICATIONS

This application claims priority to German Patent Application Ser. No. 102019208948.8, filed Jun. 19, 2019, the disclosure of which is hereby incorporated by reference in its entirety.

FIELD OF THE DISCLOSURE

The present disclosure relates to a powershift transmission, and in particular to a steplessly switchable powershift transmission.

BACKGROUND

Steplessly switchable powershift transmissions are known in principle from the prior art. DE 23 35 629 A1 describes, for example, a powershift transmission in which by a planetary stage a drive torque can be transmitted via a mechanical and via a non-mechanical power path to an output shaft. The mechanical torque transmission is in this instance produced in the form of gear pairs which can accordingly be stepped up or down. A hydraulic unit comprising a hydraulic pump and a hydraulic motor is used as a non-mechanical drive path. The hydraulic pump is driven by the drive shaft and accordingly produces a pressure in the hydraulic fluid. This pressure is used to drive the hydraulic motor which in turn is connected to the output shaft. The hydraulic unit is in this context constructed as a torque converter, wherein an adjustment of the torque which is intended to be transmitted is carried out by an adjustment of the valve stroke of the hydraulic pump or the hydraulic motor. A switchability via the mechanical power path is not provided so that the non-mechanical power path is solely responsible for a change or adaptation of the torque transmission.

DE 103 19 252 A1 also sets out a powershift transmission having a mechanical power path and a non-mechanical power path, wherein the non-mechanical power path can be formed by either a hydraulic unit or an electronic unit, wherein an electronic unit accordingly comprises a generator and an electric motor. Also in this instance, there is brought about a power branching by a planetary stage, wherein, in contrast to the powershift transmission described above, a transmission of the drive torque to the output shaft can be carried out only by the mechanical power path. The non-mechanical power path is provided only to absorb a specific proportion of the torque. A transmission of the torque to the output shaft may be provided by two switch units, wherein both of these switch units differ from each other as a result of the step-down or step-up ratio.

In the context of the present disclosure, the term switch unit is intended to be understood to refer to the combination of a drive toothed wheel and an output socket gear, wherein the drive toothed wheel and the output socket gear are in engagement with each other. However, a switch unit may also comprise other components.

The powershift transmissions described above have been found to be advantageous in principle. However, they can be improved. In particular, the transmission of torques via the torque converter represents a relatively inefficient torque transmission so that the stepless nature to some degree is at the expense of the gearing efficiency.

Against this background, there is a need to provide a powershift transmission which, on the one hand, is distinguished by an improved gearing efficiency and, on the other hand, can be produced in an easy and cost-effective manner.

SUMMARY

According to one embodiment of the present disclosure, a powershift transmission has an input shaft and an output shaft which is arranged parallel therewith, wherein there is arranged on the input shaft a branching unit via which a torque acting on the input shaft can be divided over two power paths, wherein a switch group which has at least two switching stages is arranged in the first power path and a torque converter is arranged in the second power path, wherein via the switch group and via the torque converter a torque can be transmitted from the input shaft to the output shaft.

The torque converter is constructed in such a manner that the second power path constitutes a non-mechanical power path. Consequently, both via the mechanical first power path and via the second non-mechanical power path, there is a torque transmission from the input shaft to the output shaft.

The two power paths are accordingly arranged parallel with each other so that in principle also only one of the two power paths would be necessary in order to transmit the torque. As a result of the combination of both transmission types, however, the advantages of both transmission types can be supplemented, wherein a mechanical torque transmission via a switch group with drive toothed wheels and output socket gears is distinguished by a high degree of efficiency and a non-mechanical torque transmission by a high degree of variability. The torque converter can thus, for example, be operated in such a manner that, during the switching of one of the switch units of the switch group, the torque converter adapts the rotation speeds within the powershift transmission in such a manner that the switching operation does not lead to an abrupt speed change of the input shaft.

However, the mechanical torque transmission via the first power path with the switch group should represent the main power path so that a larger power proportion is transmitted via the first power path than via the second power path.

The division of the torque is in a fixed ratio and is based only on the choice of the selected technology. It has been found to be advantageous for a maximum of 30% of the maximum gear input power to be transmitted via the torque converter. At low speeds (0-6 km/h), 30-100% of the gear input power is transmitted via the torque converter. The power which can be transmitted in this range is limited to less than 30% of the maximum gear input power as a result of traction limitations.

The torque converter may be constructed both hydraulically and electrically, wherein regardless of the specific type, the torque converter has at least a first machine and a second machine which is operationally connected to the first machine. In the case of a hydraulic configuration, the machines are hydraulic machines which can act either in the form of a hydraulic pump or in the form of a hydraulic motor. In the case of an electrical configuration, the machines are electrical machines, wherein one of the machines is constructed as a generator and the other as an electric motor. In principle, both machines may be constructed identically, wherein the precise function thereof is dependent on the adjusted operating mode. If the machines are electrical machines, there is provided between the two machines a control unit which may comprise, for example, a regulation unit or a battery.

A powershift transmission which is constructed in this manner can, when two electric or hydraulic machines are used, be operated in such a manner that the first machine taps the torque downstream of the branching unit from the second power path and converts the power produced by the torque via a construction as a generator into electric current. In the case of a hydraulic first machine, the first machine would then convey a specific quantity of hydraulic oil under a specific pressure. Consequently, the first machine would then be constructed as a hydraulic pump. In both cases, either the electric current or the hydraulic fluid could be transmitted to the second machine, wherein both the quantity of hydraulic fluid and the electric current would be adjusted or controlled in a selective manner. The electric current or the hydraulic fluid then operates the second electric or hydraulic machine and thus transmits the torque to the output shaft. Via the control of the current throughflow or via the adjustment of the conveyed hydraulic quantity, the torque which is intended to be transmitted can then be adjusted in a selective manner. It is thereby possible between the individual switching stages from the mechanical first power path to bring about a stepless nature or a stepless transition between the individual mechanical switching stages.

Alternatively, with such an embodiment, the speed of the components can also be adapted in such a manner that, in a switching operation of the powershift transmission, the gear input shaft does not change the speed and the switching operation would thereby not be perceptible as a result of a jerk since in this instance the first machine provided directly downstream of the branching device would selectively adapt the speed of the components from the second power path.

Such an operating method is particularly advantageous when the branching unit is formed by a planetary stage. A planetary stage is composed of a central sun wheel, planets which orbit the sun wheel and which are arranged on a planet carrier and a ring gear which surrounds the planets. Both the sun wheel and the planet carrier and the ring gear are suitable for being operated individually. The input shaft is connected directly to the planet carrier so that the drive torque is introduced only via the planet carrier into the power branching unit. The power paths are in contrast driven via the ring gear and the sun wheel, wherein the sun wheel of the planetary stage is connected to the second power path and the ring gear is connected to the first power path.

In such an embodiment, it is possible for the speed of the sun wheel to be adapted in such a manner that the speed of the input shaft does not change.

The switch group is constructed in such a manner that the switch units each comprise a drive toothed wheel and an output socket gear which is in engagement with the drive toothed wheel, wherein the drive toothed wheels of the switch group are arranged on the input shaft and the output socket gears of the switch group are arranged on the output shaft. Furthermore, each switch unit is associated with an individual clutch, via which the individual switch units can be coupled or uncoupled.

Coupling or uncoupling the switch units is in the context of this disclosure intended to be understood to mean that by activating the clutch a torque can be transmitted via the drive toothed wheel and the output socket gear from the input shaft to the output shaft. If the clutch is not activated, there is no corresponding torque transmission. The clutches are constructed as plate clutches and arranged either on the drive toothed wheel on the input shaft or on the output socket gear on the output shaft.

In another embodiment of the present disclosure, the drive toothed wheels of the switch group or the output socket gears of the switch group are arranged on an outer shaft portion, wherein the outer shaft portions of the drive toothed wheels surround the input shaft and the outer shaft portions of the output socket gears surround the output shaft at the periphery. The output shaft portions are therefore hollow shafts, which rotatably surround the corresponding input shaft or output shaft. Accordingly, a coupling may, for example, be carried out in such a manner that by a clutch the respective outer shaft portions of the output socket gears are coupled to the output shaft. There is thereby produced a torque transmission via the output socket gears to the output shaft.

With regard to the drive toothed wheels, there is a specific feature that, in addition to the outer shaft portions, there is provided a hollow transmission shaft which also surrounds the input shaft at the periphery and which adjoins the input shaft directly in a radial direction. This transmission shaft is arranged in the first power path and accordingly adjoins the branching unit. If the branching unit is constructed as a planetary stage, the transmission shaft is connected to the ring gear of the planetary stage. The input shaft and the transmission shaft cannot be coupled to each other so that, for the input shaft at one side and for the transmission shaft at the other side, both other speeds and other torques can be produced.

In order to be able to ensure that the switch units on the drive toothed wheels are connected, the respective outer shaft portions are arranged in such a manner that they surround both the input shaft and the transmission shaft at the periphery. Consequently, there is produced a coupling between the outer shaft portions of the drive toothed wheels and the transmission shaft.

As a result of the transmission shaft in the first power path and as a result of the torque converter in the second power path, the rotation speeds of all components which are located between the input shaft and the output shaft can be adapted individually so that the effect already described above of a switching jerk can be prevented.

The first machine of the torque converter does not directly adjoin the branching unit or the sun wheel of a branching unit which is constructed as a planetary stage, but instead via a toothed wheel pair, wherein the toothed wheel pair can bring about both a step-up and a step-down action.

In a further development of the present disclosure, the output shaft is not constructed in one piece, but instead in two pieces so that a first and a second output shaft unit are formed and are orientated coaxially with respect to each other. Both output shaft units are connected to each other by a clutch, wherein the switch group can transmit a torque to the first output shaft unit and the torque converter can transmit a torque to the second output shaft unit.

As a result of such a configuration, it is possible for the individual power paths to be able to be separated from each other, wherein the second output shaft portion constitutes the portion of the output shaft to which corresponding machines can be connected and operated. By opening the clutch, the first power path is separated so that only a torque transmission via the second non-mechanical power path and consequently via the torque converter is carried out. Although such a torque transmission is in principle not particularly effective, a reversing unit can be readily integrated. To this end, the clutch is open at one side and at the same time at least two switch units are coupled. As a result of the connection of two switch units, a torque transmission between the first output shaft portion and the input shaft is blocked so that accordingly, in an embodiment as a planetary stage, the branching unit has no rotation on the ring gear. Accordingly, the entire drive power is transmitted from the input shaft to the first machine, wherein this machine then transmits the power either in an electronic manner or in a hydraulic manner to the second machine. The second machine then brings about a transmission of the drive power to the second output shaft portion.

Regardless of the specific operating mode, it may be advantageous for the second machine not to directly bring about a torque transmission to the output shaft or to the second output shaft portion, but instead by interposing at least one toothed wheel pair. This toothed wheel pair can bring about either a step-down or a step-up action. In order to be able to better adapt to different load states, it may be advantageous for more than two toothed wheel pairs, for example, three toothed wheel pairs, which differ from each other with regard to their step-down or step-up ratio to be provided.

Another embodiment according to the present disclosure forms an optional gear mechanism. This gear mechanism does not have to be constructed to be a powershift transmission. The switching is carried out when 100% of the power is transmitted mechanically, that is to say, the second machine is without power. This switching location thereby has no negative influence.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
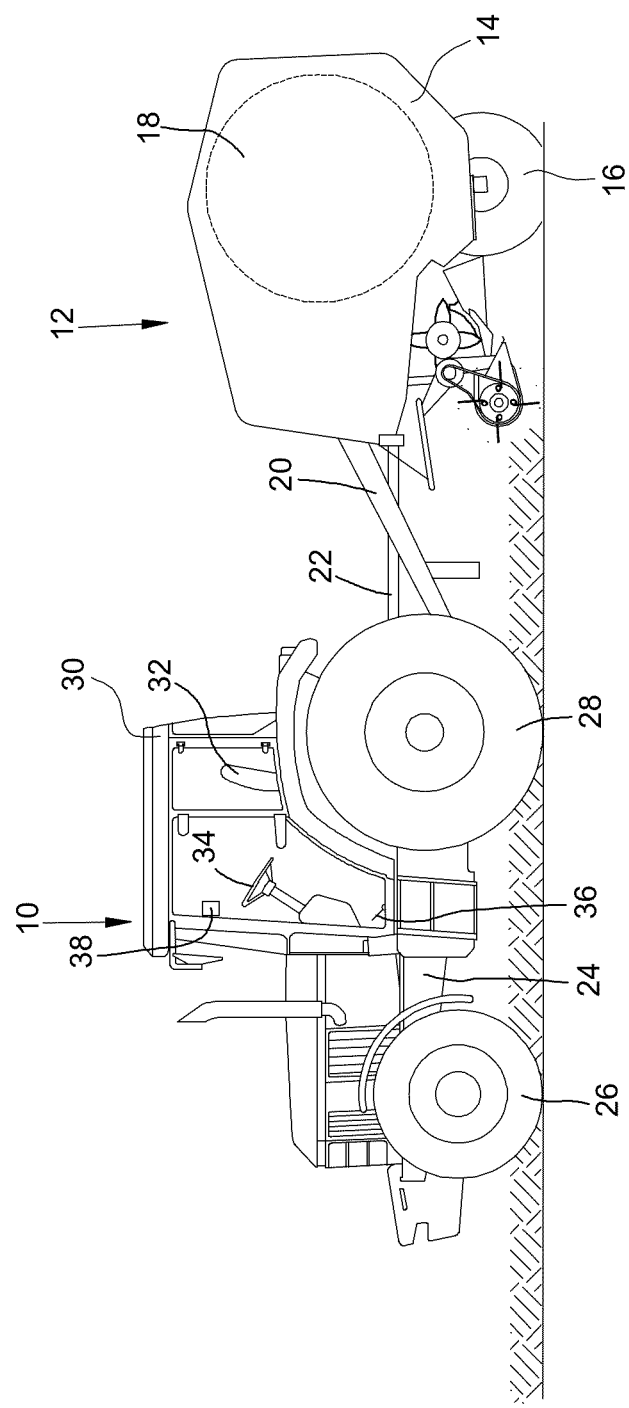
FIG. 1 is a schematic illustration of an agricultural machine.

FIG. 1 shows an agricultural machine in the form of a tractor 10 and any device 12 pulled by the tractor. In this embodiment, the machine is constructed, for example, as a round baler. The device 12 comprises a chassis 14 which is supported on wheels 16 and which has a bale formation chamber 18. The device 12 is pulled via a towbar 20 by the tractor 10. The drivable elements thereof are driven by a PTO shaft 22 by the tractor 10.

The tractor 10 comprises a chassis 24 which is supported on front, steerable wheels 26 and wheels 28 which are driven backwards. An operator workplace having a seat 32 is located in a cab 30. From the seat, a steering wheel 34, an accelerator pedal 36 and an operator station 38 can be activated.

Figure 2:
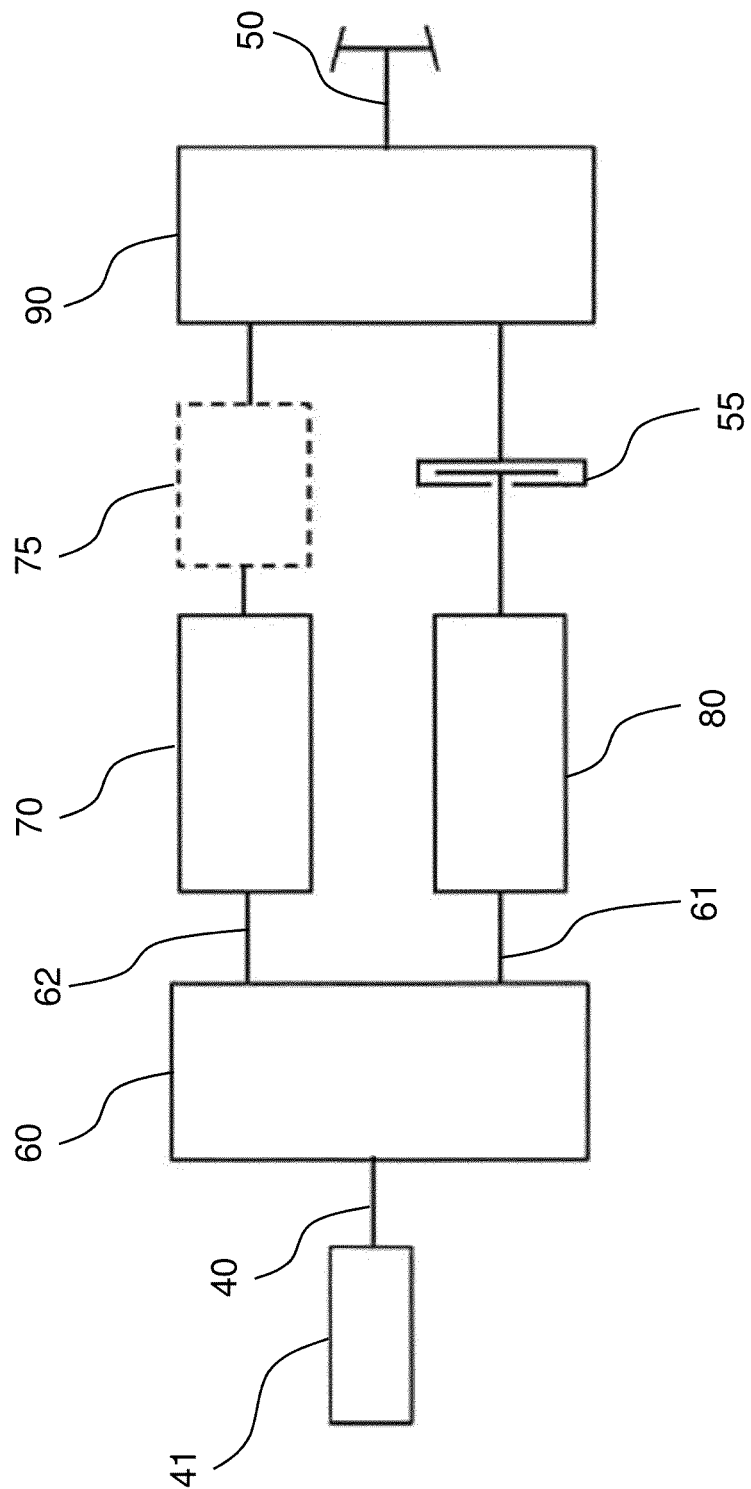
FIG. 2 is a schematic illustration of the powershift transmission.

FIG. 2 is a schematic illustration of the powershift transmission according to the present disclosure, wherein a drive motor 41 drives a drive shaft 40. Via a branching unit 60, drive power which is introduced via the drive shaft is divided over a first power path 61 and a second power path 62, wherein the first power path 61 is constructed as a mechanical power path via which a torque can be transmitted from the drive shaft 40 to the output shaft 50. To this end, a switch group 80 is provided. The first power path 61 further has a clutch 55 via which the second power path 61 can be uncoupled in such a manner that no torque transmission to the output shaft 50 is possible.

The second power path 62 is constructed in a non-mechanical manner and has to this end a torque converter 70 via which a torque can be transmitted either in an electric or in a hydraulic manner to the output shaft 50. It is further possible to use one or more stepped-down or stepped-up toothed wheel pairs 75 via which the torque transmitted from the torque converter 70 can accordingly be stepped down or stepped up.

In order to combine the two power paths 61 and 62, there is further provided a combination unit 90 which transmits the powers from the first mechanical power path 61 and from the second non-mechanical power path 62 to the output shaft 50.

Figure 3:
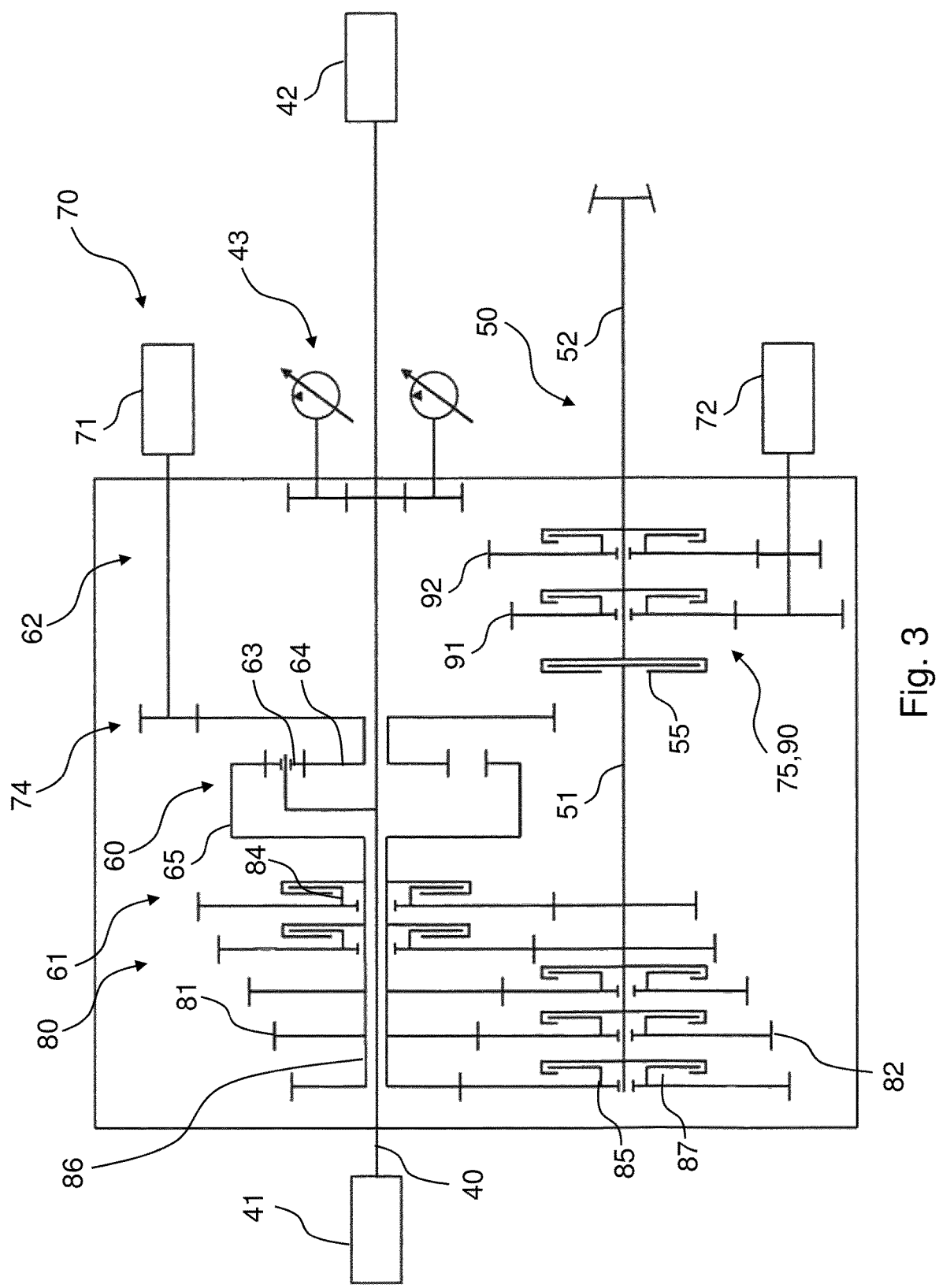
FIG. 3 is a schematic drawing of another embodiment of the powershift transmission according to the present disclosure.

FIG. 3 shows an exemplary embodiment of the powershift transmission according to the present disclosure. The drive motor 41 transmits a torque or a drive power to the input shaft 40. There is arranged on the input shaft 40 a branching unit 60 which in the example shown is constructed as a planetary stage. Accordingly, the branching unit 60 has a sun wheel 64, a plurality of planets which are arranged on a planet carrier 63 and a ring gear 65, wherein the planets are arranged between the sun wheel 64 and the ring gear 65. The input shaft 40 is directly connected to the planet carrier 63 and represents the only source via which a torque or via which a drive power can be transmitted from the drive motor 41 to the branching unit 60.

The sun gear 64 and the ring gear 65 form the starting points for the first power path 61 and the second power path 62, wherein the first power path 61 is connected to the ring gear 65 and the second power path 62 is connected to the sun wheel 64. Starting from the ring gear 65, the torque guided via the first power path 61 or the power transmitted via the first power path 65 is transmitted to a transmission shaft 86. The transmission shaft 86 is constructed to be hollow and directly surrounds the input shaft 40 in a rotatable manner. It is thereby possible for the input shaft 40 and the transmission shaft 86 to be able to have different rotation speeds.

There is provided between the transmission shaft 86 and the output shaft 50 a switch group 80, via which the torque can be transmitted from the transmission shaft 86 to the output shaft 50. To this end, drive toothed wheels 81 are arranged on the transmission shaft 86 and output socket gears 82 are arranged on the output shaft 50. Each combination of a drive toothed wheel 81 and an output socket gear 82 forms a switch unit 84, wherein the drive toothed wheels 81 and the output socket gears 82 of a switch unit 84 are in engagement with each other. In the example shown, a total of five switch units 84 are provided and are different from each other with regard to their step-down or step-up ratio so that simply as a result of the switch group 80 a total of five different switching states can be adjusted. However, it is also within the scope of the present disclosure that a smaller or larger number of switch units 84 may be provided.

In order to switch the individual switch units 84, each switch unit 84 is associated with a separate clutch 87, wherein a coupled switch unit 84 means that a torque or a drive power can be transmitted via this switch unit 84. In order to ensure a transmission, it is significant in this instance for only one switch unit 84 to be activated.

For coupling, each switch unit 84 has either on the drive toothed wheel 81 or on the output socket gear 82 an outer shaft portion 84, 85 which surrounds either the output shaft 51 or the transmission shaft 86 in a peripheral direction. By activating one of the clutches 87, a rotationally secure connection is accordingly provided either between the transmission shaft 86 and the outer shaft portion 84 or between the outer shaft portion 85 and the output shaft 50.

The output shaft 50 is further subdivided into two output shaft units 51, 52, which are orientated coaxially relative to each other and which are connected to each other by means of a clutch 55. There is consequently produced a direct transmission of the torque or the drive power from the first output shaft unit 51 to the second output shaft unit 52, wherein it is in principle also within the scope of the present disclosure that there is arranged between the two output shaft units 51, 52 an additional toothed wheel pair via which a step-down or step-up is produced between the two output shaft units 51, 52. The output socket gears 82 are arranged together with the output shaft portions 85 and the associated clutches 87 on the first output shaft unit 51.

By releasing the clutch 55, the two output shaft units 51, 52 are separated from each other so that a combination of the two power paths 61, 62 is no longer possible. Accordingly, the torque is transmitted via the second power path 62 to the second output shaft unit 52. To this end, a toothed wheel pair 74 is initially arranged on the input shaft 40 and is directly connected to the sun wheel 64 of the branching unit 60. Via the toothed wheel pair 74, it is again possible to achieve a step-up or a step-down, wherein the drive toothed wheel of the toothed wheel pair 74 is arranged on the input shaft and is constructed so as to rotate with respect to the input shaft. The output socket gear is connected via a separate shaft to a first machine 71 of the torque converter 70. The first machine 71 can be constructed as either an electrical or a hydraulic machine. At the same time, it may apply an additional torque to the toothed wheel pair 74 and consequently to the sun wheel 64. In this instance, the electrical machine 71 would act as an electric motor or as a hydraulic motor. Alternatively, the first machine 71 can also absorb a torque originating from the sun wheel 64 or a power originating from the sun wheel 64. In this instance, the first machine 71 would be constructed as an electrical generator or as a hydraulic pump.

The first machine 71 is operationally connected to the second machine 72, wherein both machines 71, 72 are constructed at the same time either as an electrical machine or as a hydraulic machine. If the machines 71, 72 are constructed as electrical machines, a current from the first machine 71 can be transmitted to the second machine 72 or vice versa, wherein between the two machines 71, 72 additional electronic components such as, for example, an electronic power unit or an accumulator can be provided. In the case of construction as hydraulic machines, between the two machines 71, 72 at least one hydraulic hose is provided, via which hydraulic fluid can be transported under a specific pressure between the two machines 71, 72.

If the first machine 71 receives a torque or a power from the sun wheel 64 of the branching unit 60, there is consequently a transmission to the second machine 72, wherein the power can be adjusted by corresponding adjustment measures.

The second machine 72 is then connected via two toothed wheel pairs 91, 92 to the second output shaft unit 52, wherein the two toothed wheel pairs 91, 92 each comprise a drive toothed wheel and an output socket gear and represent different step-up or step-down ratios. Consequently, the torque is not transmitted directly between the second electrical machine 72 and the second output shaft unit 52, but instead adapted accordingly via the two toothed wheel pairs 91, 92. In this instance, the two toothed wheel pairs 91, 92 are arranged parallel with each other and accordingly represent two possible switching states which cannot, however, be switched at the same time.

The toothed wheel pairs 91, 92 consequently represent, on the one hand, another step-down or step-up possibility but are at the same time also a combination unit 90 via which the two power paths 61, 62 are combined.

At the input shaft 40, additional machines 42, 43 may further be provided and adjoin the input shaft 40 either directly or via corresponding toothed wheel pairs in a stepped-down or stepped-up manner.

The clutch 55, which is already described above and which connects the two output shaft units 51, 52 to each other, is always closed in forward mode. The individual switch units 84 represent different switch steps so that, depending on the number of switch units, specific discrete switching states can be adjusted via the first mechanical power path 61. Such a torque transmission is particularly efficient, wherein, however, a purely mechanical torque transmission does not enable stepless switching.

The intermediate regions are therefore provided by the non-mechanical second power path 62 so that a particularly advantageous combination of mechanical and non-mechanical power paths 61, 62 is formed.

If reverse travel is intended to be enabled with the powershift transmission, the clutch 55 is opened and at least two of the switch units 84 are switched. As a result of the different step-down or step-up ratios of the switch units 84, no torque can be effectively transmitted to the second output shaft unit 51 since a rotation of the output shaft unit 51 is not possible. Accordingly, the two connected switch units 84 lead to a blocking of the first mechanical power path 51.

As a result of the uncoupling of the clutch 55, however, the second power path can continue to be operated, wherein the ring gear 65 of the branching unit 60 now forms a fixed portion of the planetary stage. The drive power of the drive motor 41 is thereby transmitted only via the second power path 62 or via the sun wheel 64, the toothed wheel pair 64 and the two machines 71, 72 and the toothed wheel pairs 91, 92 to the second output shaft unit 52. There is accordingly a purely non-mechanical power transmission from the drive shaft 40 to the output shaft 50 or to the second output shaft unit 52. Such a power transmission is also referred to as a serial/hybrid power transmission.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A powershift transmission, comprising:
an input shaft;
an output shaft arranged parallel with the input shaft, the output shaft including a first output shaft unit arranged coaxially with a second output shaft unit;
a branching unit arranged on the input shaft through which a torque acting on the input shaft is divided between a first power path and a second power path;
a switch group including a plurality of switching units arranged in the first power path, the switch group being connected to the first output shaft unit;
a first machine and a second machine arranged in the second power path, the first machine being connected to the input shaft, the second machine being connected to the second output shaft unit, and the second machine being operationally connected to the first machine; and
a clutch connecting the first output shaft unit and the second output shaft unit;
wherein a first portion of the torque is transmitted from the input shaft to the first output shaft unit via one of the plurality of switching units;
wherein a second portion of the torque is transmitted from the input shaft to the second output shaft via the first machine and the second machine;
wherein in a first mode the clutch is closed connecting the first output shaft unit and the second output shaft unit and combining the first power path and the second power path so that the torque is transmitted via the first power path, the second power path, or both; and
wherein in a second mode the clutch is open and at least two of the plurality of switching units are switched preventing the rotation of the first output shaft unit and blocking the first power path so that the torque is transmitted via the second power path.

2. The powershift transmission of claim 1, wherein the first and the second machines comprise electrical or hydraulic machines.

3. The powershift transmission of claim 1, wherein the plurality of switch units each comprise a drive toothed wheel in engagement with an output socket gear.

4. The powershift transmission of claim 3, wherein the drive toothed wheels are arranged on a transmission shaft located in the first power path and surrounding the input shaft and the output socket gears are arranged on the first output shaft unit.

5. The powershift transmission of claim 3, further comprising a clutch associated with each of the plurality of switch units via which each switch unit is operably connected.

6. The powershift transmission of claim 1, wherein the branching unit comprises a planetary stage including a sun wheel connected to the first machine, a ring gear connected to the switch group, and a planet carrier connected to the input shaft.

7. The powershift transmission of claim 6, wherein the first machine is connected to the sun wheel by a toothed wheel pair.

8. The powershift transmission of claim 1, wherein the second machine is connected to the second output shaft unit via at least one toothed wheel pair.

9. The powershift transmission of claim 1, wherein the clutch is closed in a forward mode and the torque is transmitted via the first power path, the second power path, or both.

10. The powershift transmission of claim 1, wherein the clutch is open in a reverse mode and the torque is transmitted only via the second power path.

11. A powershift transmission, comprising:
an input shaft;
an output shaft arranged parallel with the input shaft, the output shaft including a first output shaft unit arranged coaxially with a second output shaft unit;
a planetary stage arranged on the input shaft through which a torque acting on the input shaft is divided between a first power path and a second power path, the planetary stage including a sun wheel, a ring gear, and a planet carrier connected to the input shaft;
a switch group including a plurality of switching units arranged in the first power path, the switch group being connected to the ring gear and the first output shaft unit;
a first machine and a second machine arranged in the second power path, the first machine being connected to the input shaft via the sun wheel, the second machine being connected to the second output shaft unit, and the second machine being operationally connected to the first machine; and
a clutch connecting the first output shaft unit and the second output shaft unit;
wherein a first portion of the torque is transmitted from the input shaft to the first output shaft unit via one of the plurality of switching units;
wherein a second portion of the torque is transmitted from the input shaft to the second output shaft via the first machine and the second machine;
wherein in a forward mode the clutch is closed connecting the first output shaft unit and the second output shaft unit and combining the first power path and the second power path so that the torque is transmitted via the first power path, the second power path, or both; and
wherein in a reverse mode the clutch is open and at least two of the plurality of switching units are switched preventing the rotation of the first output shaft unit and blocking the first power path so that the torque is transmitted via the second power path.

12. The powershift transmission of claim 11, wherein the first and the second machines comprise electrical or hydraulic machines.

13. The powershift transmission of claim 11, wherein the plurality of switch units each comprise a drive toothed wheel in engagement with an output socket gear.

14. The powershift transmission of claim 13, wherein the drive toothed wheels are arranged on a transmission shaft located in the first power path and surrounding the input shaft, and the output socket gears are arranged on the first output shaft unit.

15. The powershift transmission of claim 13, further comprising a clutch associated with each of the plurality of switch units via which each switch unit is operably connected.

16. The powershift transmission of claim 11, wherein the first machine is connected to the sun wheel by a toothed wheel pair.

17. The powershift transmission of claim 11, wherein the second machine is connected to the second output shaft unit via at least one toothed wheel pair.

* * * * *